(12) United States Patent
Gough

(10) Patent No.: US 8,161,322 B2
(45) Date of Patent: Apr. 17, 2012

(54) METHODS AND APPARATUS TO INITIATE A BIOS RECOVERY

(75) Inventor: Robert E. Gough, Sherwood, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 12/632,419

(22) Filed: Dec. 7, 2009

(65) Prior Publication Data

US 2011/0138220 A1 Jun. 9, 2011

(51) Int. Cl.
*G06F 11/00* (2006.01)
(52) U.S. Cl. ......................................................... 714/15
(58) Field of Classification Search .................. 714/15, 714/5.1, 2, 6.1; 713/1
See application file for complete search history.

(56) References Cited

U.S. PATENT DOCUMENTS

| | | | |
|---|---|---|---|
| 6,721,881 B1* | 4/2004 | Bian et al. ......................... | 713/1 |
| 6,757,838 B1* | 6/2004 | Chaiken et al. .................... | 714/5 |
| 2003/0135350 A1* | 7/2003 | Cheston et al. ............... | 702/186 |
| 2003/0182487 A1* | 9/2003 | Dennis et al. ................. | 710/305 |
| 2007/0168737 A1* | 7/2007 | Lee et al. ......................... | 714/36 |
| 2008/0034152 A1* | 2/2008 | Wang et al. .................... | 711/103 |
| 2009/0119445 A1* | 5/2009 | Kolvick et al. ............... | 711/103 |

* cited by examiner

*Primary Examiner* — Scott Baderman
*Assistant Examiner* — Yair Leibovich
(74) *Attorney, Agent, or Firm* — Hanley, Flight & Zimmerman, LLC

(57) ABSTRACT

Methods and apparatus to initiate a basic input/output system (BIOS) recovery are disclosed herein. An example BIOS recovery module includes a memory storing one or more signatures to be detected by a detector of a BIOS implemented on a computing platform; and a connector to couple the module to a data display channel of the computing platform, wherein a BIOS recovery mechanism of the BIOS is to initiate in response to the detector detecting the one or more signatures of the module via the data display channel.

25 Claims, 3 Drawing Sheets

METHODS AND APPARATUS TO INITIATE A BIOS RECOVERY

FIELD OF THE DISCLOSURE

The present disclosure relates generally to computer system platforms and, more particularly, to methods and apparatus to initiate a basic input/output system (BIOS) recovery.

BACKGROUND

Personal computers, workstations, servers, and/or any other computing platforms typically include a basic input/output system (BIOS) as an interface between computer hardware (e.g., a processor, chipsets, memory, etc.) and an operating system (OS). The BIOS includes firmware and/or software code to initialize and enable low-level hardware services of the computer, such as basic keyboard, video, disk drive, input/output (I/O) port, and chipset drivers associated with a computer motherboard. Additionally, the BIOS often includes a BIOS recovery mechanism to enable a restoration of the BIOS (e.g., to a configuration known to the system as a functional configuration) in the event the BIOS becomes corrupted, inoperable or otherwise unusable.

DETAILED DESCRIPTION

Figure 1:
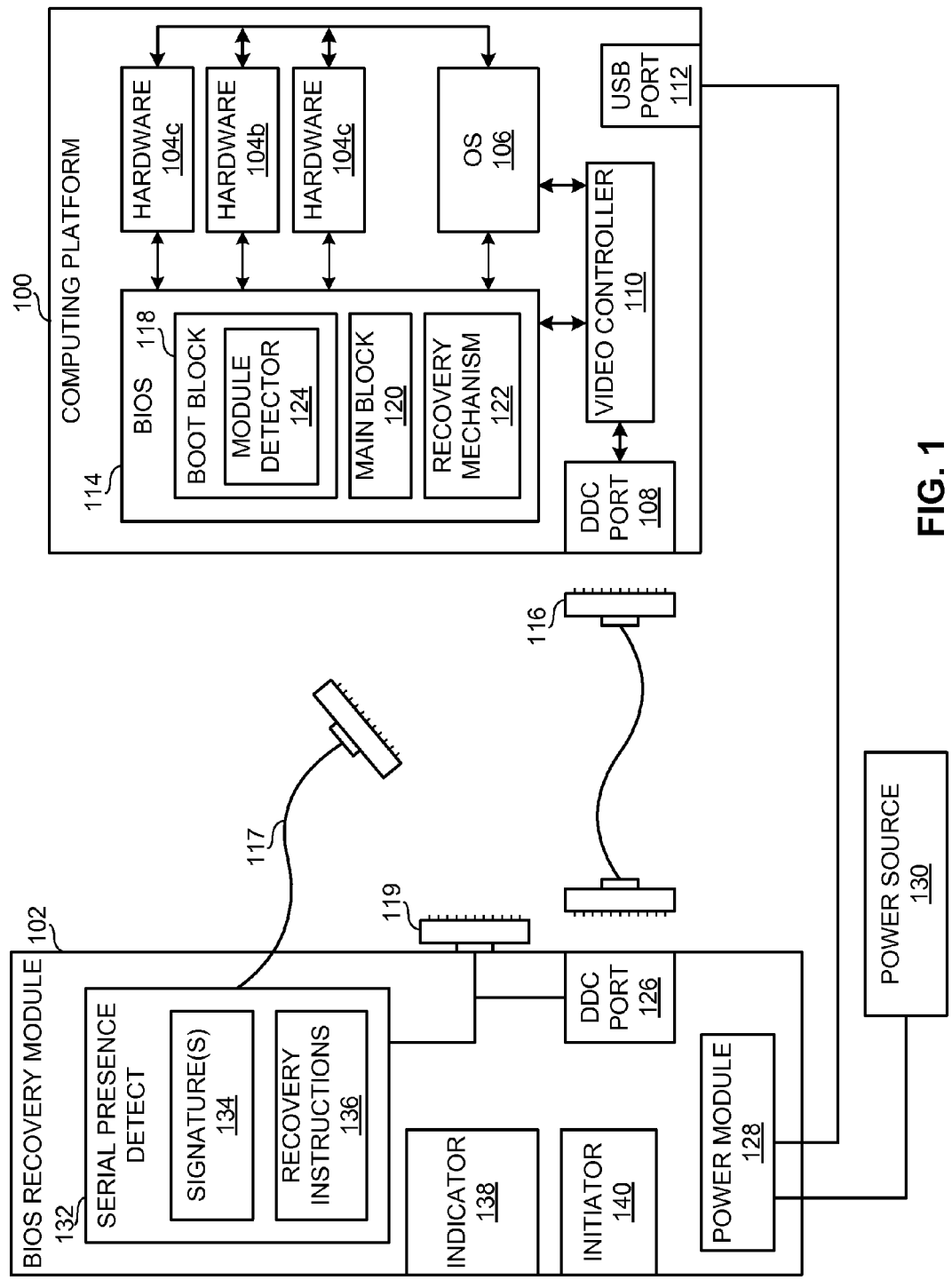
FIG. 1 is a block diagram illustrating an example implementation of an example basic input/output system (BIOS) recovery module and an example computing platform including an example BIOS.

Although the following discloses example methods, apparatus, systems, and/or articles of manufacture including, among other components, firmware and/or software executed on hardware, it should be noted that such methods, apparatus, systems, and/or articles of manufacture are merely illustrative and should not be considered as limiting. For example, it is contemplated that any or all of the firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

Computing platforms or systems (e.g., personal computers, workstations, servers, personal digital assistants (PDAs), smartphones, etc.) have hardware that, when working together, allows the platform to execute an operating system. After initiation of an operating system, the platform can execute one or more applications such as, for example, word processing applications and/or games on personal computers, network communication applications on servers, and/or other custom and/or commercial applications on other example platforms. Prior to executing the applications, the operating system typically initializes and takes control of the platform hardware including, for example, hard drive(s), memory, I/O facilities (e.g., disk adapters, compact disk (CD) drives, digital versatile disk (DVD) drives, local area network (LAN) adapters, serial ports, terminals, graphics/audio cards, etc.).

The operating system is itself a software application read from a hard drive. Thus, a base level initialization of the underlying hardware is accomplished via a basic input/output system (BIOS) before the operating system may take control of the platform and the hardware thereof. Typically, the BIOS is implemented as software and/or firmware in the form of machine readable instructions that are stored in a non-volatile memory coupled to a processor of the computing platform. Following a reset operation, or the application of power to the processor, the processor executes the BIOS instructions. Generally, the BIOS performs one or more hardware and software configuration and test activities (e.g., component level power-on self test (POST) operations, memory initialization, memory partitioning, etc.) prior to booting the operating system.

At times, the BIOS may need to be updated. For example, the BIOS may need a plurality of updates during development of the computing platform and the components thereof. For instance, a designer, engineer, technician, programmer, and/or any other development personnel may make an alteration and/or redesign (e.g., in the hardware and/or operating system with which the BIOS is configured to interact) as the computing platform is designed, tested, fabricated, and/or otherwise configured. Such an alteration and/or redesign may cause the BIOS to become outdated and/or configured incorrectly in light of the alteration or redesign. Additionally or alternatively, the BIOS may need one or more updates after the computing platform is put into use (e.g., after a user begins operating the platform). In some circumstances, a user and/or technician may update, upgrade, and/or otherwise change certain components of the platform (e.g., the user may replace and/or add to the processor, graphics card, memory, etc.) to improve the machine and/or fix a problem. Such an update, upgrade, and/or other type of change may cause the BIOS to become outdated and/or configured incorrectly in light of the update, upgrade, and/or other type of change. In such instances, the BIOS needs to be updated for the platform to function properly.

Updating the BIOS is often referred to as flashing the BIOS. Generally, flashing the BIOS includes overwriting the current BIOS code with a new BIOS image file that includes the updated code. Flashing the BIOS is often viewed as a hazardous procedure due to the potential effects of a failure during flashing. Example problems incurred during flashing include power failure and/or using the incorrect BIOS image file to update the BIOS. An unsuccessful flashing of the BIOS can render the BIOS inoperable, thereby preventing the computing platform from booting. In such instances, a BIOS recovery mechanism is often invoked to restore (or at least attempt to restore) the functionally of the BIOS. While different BIOS employ different types of recovery mechanisms, a common example recovery mechanism comprises a backup copy of the current BIOS that may be loaded in response to an invocation of the recovery process.

Instructing the BIOS to engage such a recovery mechanism and/or one or more recovery processes may expose the platform to risk and/or encumber a user with difficulties. As described in detail below, the BIOS is typically stored on a chip (e.g., a flash chip) that can be reprogrammed but, during normal operation, is usually not. On some platforms, physical access to the BIOS chip is required to invoke the BIOS recovery mechanism (e.g., to remove a jumper or engage a switch configured to dictate a mode (e.g., normal mode or recovery mode) in which the BIOS operates). However, gaining physical access to the BIOS (e.g., accessing a BIOS chip) is often an intricate, time-consuming process. In particular, during development and/or testing/debugging of the computing platform, which is when the BIOS is likely to require frequent updates and, thus, a plurality of recovery invocations, gaining physical access to the BIOS chip can involve significant time and resources. In some examples, gaining physical access to the BIOS chip to invoke the recovery mechanism involves one or more hardware reworks (e.g., desoldering and resoldering a flash component associated with the BIOS), removing a chassis of the computer platform, and/or other time-consuming procedures.

The example methods, apparatus, systems, and/or articles of manufacture described herein enable an invocation of a BIOS recovery mechanism without having to physically access to the BIOS chip. As described in greater detail below, the example methods, apparatus, systems, and/or articles of manufacture described herein utilize a module that can be coupled to a data port of a computing platform. Generally, when the BIOS of the computing platform recognizes the module as coupled to the data port (e.g., by reading one or more signatures stored on the module), the BIOS engages a BIOS recovery process. Additional or alternative aspects and/or advantages of the example methods, apparatus, systems, and/or articles of manufacture described herein are described in detail below in connection with FIGS. 1 and 2.

FIG. 1 is a block diagram illustrating an example implementation of an example computing platform 100 and an example BIOS recovery module 102. The platform 100 may be any type of computing platform such as, for example, a personal computer, a workstation, a server, a PDA, a kiosk, a smartphone, etc. The platform 100 includes a plurality of hardware components 104a-c, an operating system 106, a display data channel (DDC) port 108, a video controller 110, a Universal Serial Bus (USB) port 112, and an example BIOS 114.

Figure 3:
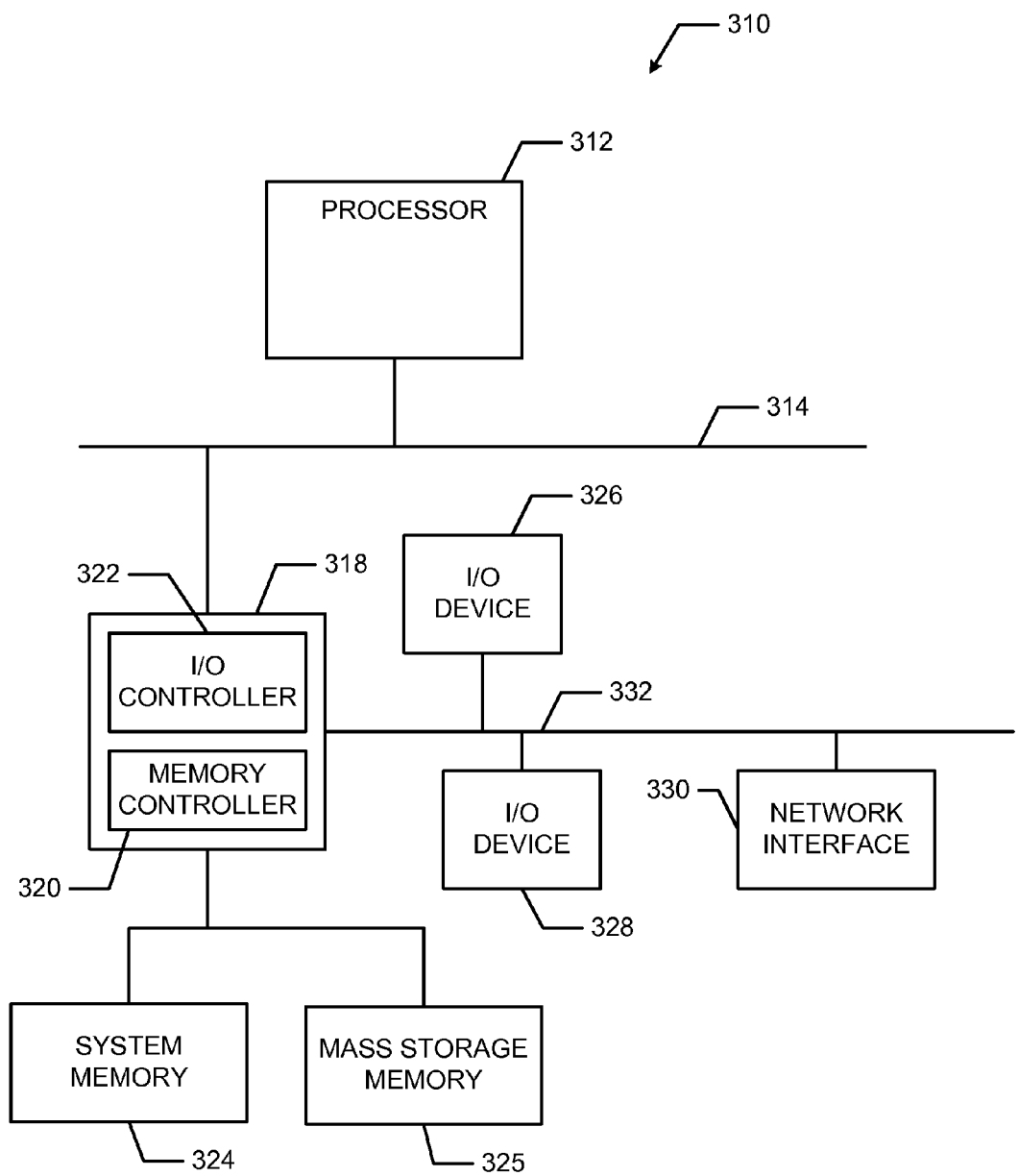
FIG. 3 is a block diagram of an example processor system that may be used to execute the machine readable instructions of FIG. 2 and/or to implement the example computing platform of FIG. 1.

The hardware 104a-c of FIG. 1 represent components of a conventional computing platform. For example, the hardware components 104a-c include at least one of a processor, system memory, an input/output (I/O) device(s), an I/O controller, a memory controller, a network interface, mass storage memory, and/or any other type of hardware capable of being implemented on a computing platform. FIG. 3, which is described in greater detail below, illustrates an example processor system including a plurality of hardware components, which may be represented by the hardware 104a-c of FIG. 1.

The DDC port 108 is to receive a cable assembly 116 of a certain protocol, technology, and/or standard such as, for example, Video Graphics Array (VGA®), Digital Video Interface (DVI®), High-Definition Multimedia Interface (HDMI®), DisplayPort®, etc. For example, a display device (e.g., a liquid-crystal display (LCD) monitor) may be coupled to the DDC port 108 via the cable assembly 116 such that information can be displayed to a user of the platform 100. The DDC port 108 of the platform 100 is in communication with the video controller 110, which may be implemented as an integrated or discrete device and may include a system management bus (SMBus) and/or I2C bus controller. The video controller 110 exchanges information between the DDC port 108 and, for example, the operating system 106 (e.g., after the operating system 106 has taken control of the platform 100 and the hardware 104a-c thereof). During normal operation of the computing platform 100, the video controller 110 sends data to the operating system 106 regarding what type of device (e.g., what brand and/or model of monitor) is coupled to the DDC port 108. The operating system 106 uses the data regarding the type of device coupled to the DDC port 108 to send display data (e.g., code to be interpreted by a display device coupled to the DDC port 108) to the DDC port 108 via the video controller 110. This exchange of information enables a display of information (e.g., a user interface of an application being executed by the operating system 106 and the hardware 104a-c) on, for example, a monitor coupled to the DDC port 108. Additionally, the DDC port 108 and the video controller 110 are utilized by the example methods, apparatus, systems, and/or articles of manufacture described herein to detect a coupling of the BIOS recovery module 102 to the platform 100. As described in greater detail below, in some examples, the example methods, apparatus, systems, and/or articles of manufacture described herein can also detect a coupling of the BIOS recovery module 102 to the platform 100 via the DDC port 108 without the video controller 110.

The BIOS 114 runs a plurality of configuration tests and initialization procedures before the operating system 106 can take control of the hardware 104a-c. In the illustrated example, the BIOS 114 includes a boot block 118, main block 120, and a recovery mechanism 122. Generally, the boot block 118 is executed first (e.g., in response to a power-up or a reset of the platform 100) and runs diagnostic code associated with the main block 120, which includes code to initialize, test, and/or configure the remaining hardware 104a-c (e.g., hardware not initialized by the boot block 118) and to authorize the operating system 106 to take control of the platform 100. Execution of the boot block 118 may determine whether any problems and/or corruption exists with respect to the main block 120. Further, the boot block 118 typically includes initialization code to initialize a limited set of hardware (e.g., a removable disk drive and/or a keyboard driver) such that that hardware can be initialized even when the main block 120 of the BIOS is corrupt. The recovery mechanism 122 includes code capable of restoring the BIOS 114 to, for example, a default configuration in the event of failure and/or corruption of the BIOS 114. In some examples, the recovery mechanism 122 includes and/or executes additional or alternative types of recovery techniques, code, etc. The example BIOS 114 of FIG. 1 can include additional or alternative blocks and/or mechanisms such as, for example, an Extensible Firmware Interface (EFI) core block, an EFI boot manager block, a non-volatile random access memory (NVRAM) block, custom blocks (e.g., virtual product data (VPD) blocks), a reserved block, etc.

In addition to the conventional code typically found in boot blocks, the example boot block 118 of FIG. 1 includes detection code 124 (referred to sometimes herein as the a module detector) to detect the presence of the example BIOS recovery module 102 described herein. That is, the example module detector 124 of FIG. 1 is to determine whether the module 102 has been coupled to the platform 100. For example, as shown in FIG. 1, the module 102 can be coupled to the DDC port 108 of the platform 100 via a cable assembly 116 and/or a cable 117 extending the module 102 having an end configured to engage the DDC port 108 of the computing platform 100 and/or other type(s) of ports of other computing platforms. Additionally, the example module 102 of FIG. 1 includes a connector 119 extending from a housing of the module 102 configured to engage the DDC port 108 of the computing platform 100 as part of a direct connector mating system and/or other types of ports of other computing platforms.

In addition to the task of relaying data from the DDC port 108 to the operating system 106, the example video controller 110 of FIG. 1 is in communication with the BIOS 114 and conveys data from the DDC port 108 to the BIOS 114. In particular, the example video controller 110 of FIG. 1 conveys information regarding any device coupled to the DDC port 108 to the BIOS 114. The example video controller 110 of FIG. 1 is capable of conveying information to the BIOS 114 when the platform 100 is in a state that requires a boot recovery procedure (e.g., when certain memory and/or registers of the platform 100 are unavailable because the memory and/or registers cannot be initialized (e.g., via the main block 120 of the BIOS 114). For instance, when the BIOS 114 is inoperable, the video controller 110 can convey information read from the DDC port 108 to the BIOS 114 (e.g., by recognizing the device coupled to the DDC port 108 as a non-display device). In some examples, the video controller 110 conveys data read from the DDC port 108 to the BIOS 114 regardless of what type of device is coupled to the DDC port 108. In such instances, the BIOS 114 may be configured to ignore information related to display devices coupled to the DDC port 108 during normal operation of the platform 100.

Thus, the module detector 124 in the boot block 118 of the BIOS 114 receives (e.g., with or without requesting such data from the video controller 110) the data regarding any device coupled to the DDC port 108 from the video controller 110. In some examples, the module detector 124 is customized for the particular video controller 110 implemented in the platform 100. For example, the module detector 124 may be configured in a first manner when the video controller 110 is implemented by an AMD graphics controller, and the module detector 124 may be configured in a second manner (which may be different from the first manner) when the video controller 110 is implemented by a NVIDIA graphics controller. The example detector 124 determines whether a device coupled to the DDC port 108 is the BIOS recovery module 102. In still other examples, the module detector 124 may be communicatively coupled to the DDC port 108 directly (e.g., without routing data via the video controller 110). As described in greater detail below, in response to detecting a coupling of the module 102 to the DDC port 108 of the platform 100, the example boot block 118 of FIG. 1 reads or otherwise receives information stored on the module 102 regarding a potential BIOS recovery operation.

By using the DDC port 108 to convey certain information to the BIOS 114 (e.g., a coupling of the module 102 to the computing platform 100), the example methods, apparatus, systems, and/or articles of manufacture described herein are able to engage the BIOS recovery mechanism 122 of systems in which the BIOS recovery mechanism 122 is otherwise inaccessible. As described above, in some systems the BIOS recovery mechanism 122 cannot be engaged without removing the chassis and/or reworking one or more components and/or programs of the respective computing system. Additionally, in some example systems, alternative types of ports are unable to engage the BIOS recovery mechanism 122 when certain hardware is unavailable (e.g., because the computing platform 100 has not been booted or initialized). For example, the USB port 112 is typically coupled to a rate-matching hub (not shown), which acts as an intermediary between the USB port 112 and the operating system 106 and/or the hardware 104*a-c*. The presence of the rate-matching hub restricts any device coupled to the USB port 112 from conveying information to, for example, the BIOS 114 in a pre-memory environment (e.g., before the memory is initialized). In other words, the BIOS 114 is unable to detect a coupling of a device to the USB port 112 due to the rate-matching hub. Therefore, in such circumstances, the USB port 112 cannot be used to initiate the BIOS recovery mechanism 122.

However, the example methods, apparatus, systems, and/or articles of manufacture described herein that use, for example, the DDC port 108, are capable of initiating the BIOS recovery mechanism 122 using the BIOS recovery module 102. In particular, the module 102 includes an example data port 126 that may be communicatively coupled to the DDC port 108 of the platform 100. In the illustrated example of FIG. 1, the data port 126 of the module 102 is configured to receive the same type of cable (e.g., the example cable assembly 116) as the DDC port 108 of the platform. In some examples, the data port 126 of the module 102 may be configured to receive a different type of cable as the DDC port 108 of the platform 100. In such instances, the two ends of the cable assembly 116 are configured differently and the cable assembly 116 is capable of, for example, converting data from one protocol, technology, standard, etc. to another. Additionally, the example BIOS recovery module 102 includes the cable 117 extending therefrom having an end configured to engage the DDC port 108 of the computing platform 100 and/or other type(s) of ports of other computing platforms. Additionally, the example BIOS recovery module 102 includes the connector 119 extending from a housing of the module 102 to implement a direct mating system with the computing platform 100. The example BIOS recovery module 102 may include one or more of the data port 126, the cable 117, the connector 119, and/or any other suitable component capable of coupling the example BIOS recovery module 102 to a display data channel of any suitable type of computing platform (e.g., the example computing platform 100 of FIG. 1).

The example module 102 of FIG. 1 also includes a power module 128 to provide power to the module 102. The power module 128 may be configured to receive power from a plurality of different types of power sources. As shown in FIG. 1, the power module 128 is configured to receive power from the USB port 112 of the platform 100 and/or an external source 130. The module 102 may be configured to receive power from additional or alternative sources such as, for example, an internal battery.

The example module 102 of FIG. 1 includes a serial presence detect (SPD) 132 having one or more signatures 134 and recovery instructions 136 stored thereon. While the illustrated example of FIG. 1 includes the SPD 132, the BIOS recovery module 102 can be implemented with one or more additional or alternative types of read-only memory (ROM) (e.g., a ROM coupled with an I2C or SMBus interface). In the illustrated example of FIG. 1, the signature(s) 134 are independent BIOS vendor (IBV) specific signatures indicative of a plurality of BIOS vendors and the BIOS products made thereby. The example IBV-specific signature(s) 134 are readable by the boot block 118. In particular, the example IBV-specific signature(s) 134 can be read by the module detector 124. The example module detector 124 of FIG. 1 reads the IBV-specific signature(s) 134 to determine whether one or more of the signature(s) 134 corresponds to the BIOS 114 and/or the computing platform 100 on which the BIOS 114 is implemented. When the module detector 124 detects the corresponding signature in the IBV-specific signature(s) 134, the example module detector 124 directs the BIOS 114 to execute the BIOS recovery mechanism 122.

The example recovery instructions 136 include information related to, for example, the recovery mechanism 122 and/or the procedures implemented thereby. One or more of the recovery instructions 136 may be conveyed to the BIOS 114 when, for example, the module detector 124 detects a corresponding one of the IBV-specific signature(s) 134. In some examples, the recovery instructions 136 are programmable instructions that can instruct the recovery mechanism 122 to, for example, initiate according to a certain configuration and/or in a certain mode.

Additionally or alternatively, the example recovery instructions 136 may include a BIOS image file to be used by the recovery mechanism 122. As described above, such a BIOS image file can restore and/or update the BIOS 114 to an operable and/or updated configuration. In some examples, when the recovery instructions 136 and/or additional or alternative components of the module 102 includes a BIOS image file to be used by the recovery mechanism 122 of the platform 100, the BIOS image file stored on the module 102 can be updated, reconfigured, replaced, etc. via any suitable control device coupled to the module 102. For example, when the module 102 is coupled to the platform 100, the platform 100 may include a mechanism (e.g., as part of the operating system 106 and/or some other dedicated program) capable of changing the recovery instructions 136 and/or the BIOS image file thereof. In addition to or in lieu of the recovery instructions 136, the example BIOS recovery module 102 of FIG. 1 may include other types of information that can be conveyed to the BIOS 114 via, for example, the DDC ports 126 and 108 such as, for example, updated firmware, information related to a manufacturer, etc.

The example BIOS recovery module 102 of FIG. 1 also includes an indicator 138 to communicate a status of a BIOS recovery procedure (e.g., by the recovery mechanism 122 when a coupling of the module 102 to the platform is detected) to, for example, a user of the module 102 and/or the computing platform 100. For example, the indicator 138 may include a first light of a first color to be illuminated when the BIOS recovery procedure is in progress and a second light of a second color to be illuminated when the BIOS recovery procedure is complete. In some examples, the indicator 138 may include a single light capable of changing colors. The example indicator 138 can include additional or alternative types of displays such as, for example, a seven-segment display or a full text display capable of communicating the status of, for example, a BIOS recovery procedure.

The example BIOS recovery module 102 of FIG. 1 also includes an initiator 140 to enable a user (e.g., a technician working with the computing platform 100) to initiate a BIOS recovery procedure via the module 102 one or more times while the module 102 is coupled to the platform 100. In other words, the example initiator 140 enables the module 102 to initiate a BIOS recovery procedure multiple times without having to couple and re-couple the module 102 to and from the platform 100 multiple times. For example, the initiator 140 may include a switch or button that the user can engage (e.g., while the module 102 is coupled to the platform 100) when an initiation of the BIOS recovery procedure is desired. When the switch or button of the initiator 140 is placed in a first position or engaged, a detection of a coupling of the module 102 by the module detector 124 causes the recovery mechanism 122 to be activated. When the switch or button of the initiator 140 is in a second position or unengaged, a detection of a coupling of the module 102 by the module detector 124 does not cause the recovery mechanism 122 to be activated. For example, the switch or button of the initiator 140 being in the second position or unengaged may restrict access to the signatures 134 and/or the recovery instructions 136. In such instances, the module detector 124 is unable to determine whether the proper signature is present in the module 102 and, thus, does not activate the recovery mechanism 122. The example initiator 140 may employ additional or alternative techniques in controlling the initiation of the BIOS recovery procedure.

While an example manner of implementing the BIOS recovery module 102 and the BIOS 114 of FIG. 1 has been illustrated in FIG. 1, one or more of the elements, processes and/or devices illustrated in FIG. 1 may be combined, divided, re-arranged, omitted, eliminated and/or implemented in any other way. Further, the example SPD 132, the example signature(s) 134, the example recovery instructions 136, the example indicator 138, the example initiator 140, and/or, more generally, the example BIOS recovery module 102 of FIG. 1, and/or the example boot block 118, the example module detector 124, the example main block 120, the example recovery mechanism 122, and/or, more generally, the example BIOS 114 of FIG. 1 may be implemented by hardware, software, firmware and/or any combination of hardware, software and/or firmware. Thus, for example, any of the example SPD 132, the example signature(s) 134, the example recovery instructions 136, the example indicator 138, the example initiator 140, and/or, more generally, the example BIOS recovery module 102 of FIG. 1, and/or the example boot block 118, the example module detector 124, the example main block 120, the example recovery mechanism 122, and/or, more generally, the example BIOS 114 of FIG. 1 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example SPD 132, the example signature(s) 134, the example recovery instructions 136, the example indicator 138, the example initiator 140, and/or, more generally, the example BIOS recovery module 102 of FIG. 1, and/or the example boot block 118, the example module detector 124, the example main block 120, the example recovery mechanism 122, and/or, more generally, the example BIOS 114 of FIG. 1 are hereby expressly defined to include a tangible medium such as a memory, DVD, CD, etc. storing the software and/or firmware. Further still, the example SPD 132, the example signature(s) 134, the example indicator 138, the example initiator 140, the example recovery instructions 136, and/or, more generally, the example BIOS recovery module 102 of FIG. 1, and/or the example boot block 118, the example module detector 124, the example main block 120, the example recovery mechanism 122, and/or, more generally, the example BIOS 114 of FIG. 1 may include one or more elements, processes and/or devices in addition to, or instead of, those illustrated in FIG. 1, and/or may include more than one of any or all of the illustrated elements, processes and devices.

Figure 2:
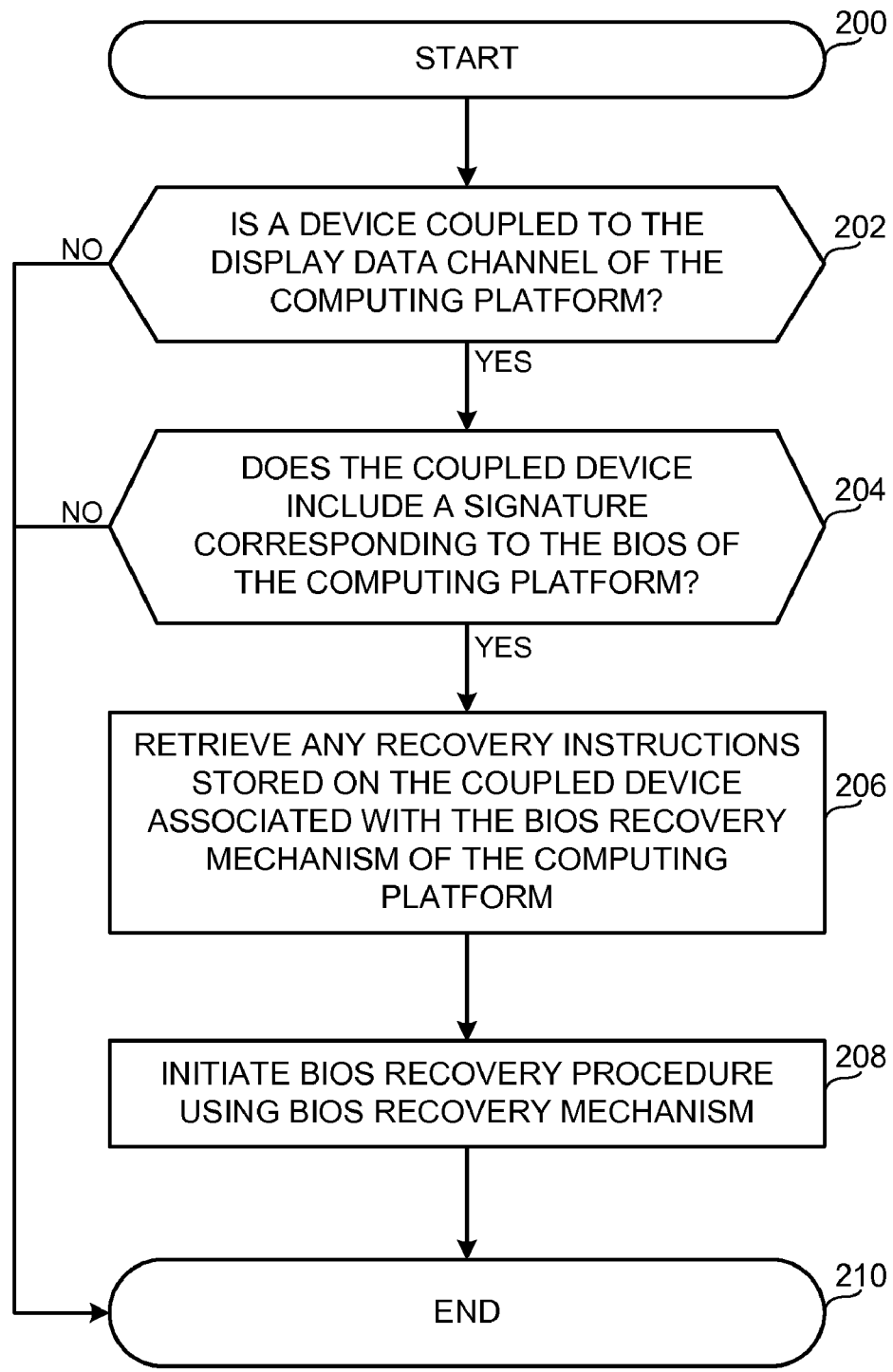
FIG. 2 is a flow diagram representative of an example process that may be implemented using example machine readable instructions that may be executed to implement the example BIOS recovery module and the example BIOS of FIG. 1 to request a BIOS recovery.

FIG. 2 is a flow diagram representing an example process that may be implemented using machine readable instructions that may be executed to implement the example systems, methods, apparatus, and/or articles of manufacture described herein. In particular, FIG. 2 depicts a flow diagram representative of machine readable instructions that may be executed to implement the example BIOS recovery module 102 and/or the example BIOS 114 of FIG. 1 and/or to execute a BIOS recovery procedure using the example methods, apparatus, systems, and/or articles of manufacture described herein. The example processes of FIG. 2 may be performed using a processor, a controller and/or any other suitable processing device. For example, the example processes of FIG. 2 may be implemented in coded instructions stored on a tangible medium such as a flash memory, a read-only memory (ROM) and/or random-access memory (RAM) associated with a processor (e.g., the example processor 310 discussed below in connection with FIG. 3). Alternatively, some or all of the example processes of FIG. 2 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 2 may be implemented manually or as any combination(s) of any of the foregoing techniques, for example, any combination of firmware, software, discrete logic and/or hardware. Further, although the example processes of FIG. 2 are described with reference to the sequence diagram of FIG. 2, other methods of implementing the processes of FIG. 2 may be employed. For example, the order of execution of the operations may be changed, and/or some of the operations described may be changed, eliminated, subdivided, or combined. Additionally, any or all of the example processes of FIG. 2 may be performed sequentially and/or in parallel by, for example, separate processing threads, processors, devices, discrete logic, circuits, etc.

As described above, the computing platform 100 may require a BIOS recovery procedure. For example, the computing platform 100 may require a BIOS recovery procedure when an error or failure occurs while flashing the BIOS. Generally, a detection of a coupling of the example BIOS recovery module 102 initiates such a BIOS recovery procedure in the computing platform 100. At the onset (block 200) of the illustrated example of FIG. 2, the video controller 110 determines whether a device is coupled to the DDC port 108 (which communicates information associated with a display data channel of the computing platform 100) and indicates to the BIOS 114 any such coupling (block 202). When a device is coupled to the DDC port 108 (block 202), the module detector 124 of the boot block 118 determines whether the coupled device includes a signature (e.g., in the signatures 134 of the module 102) corresponding to the BIOS 114 of the computing platform 100 (block 204). Thus, the detector 124 determines whether the example BIOS recovery module 102 is coupled to the DDC port 108 and whether the BIOS recovery module 102 includes an indication that the BIOS recovery mechanism 122 should be initiated (e.g., by identifying the proper signature stored on the example BIOS recovery module 102). In some examples, when the module 102 includes the initiator 140, a switch or button may be engaged in addition to the coupling of the module 102 to the DDC port 108 for the detector 124 to determine whether, for example, the module 102 includes the indication that that BIOS recovery mechanism should be initiated. That is, the initiator 140 may or may not restrict access to the signatures 134. In such instances, the detector 124 may repeatedly attempt to detect the proper signature a certain number of times and/or for a certain period of time.

When the module detector 124 determines that the example BIOS recovery module 102 of FIG. 1, which includes a signature corresponding to the example BIOS 114 of FIG. 1, is coupled to the DDC port 108 (block 204), the BIOS 114 retrieves the recovery instructions 136 stored on the BIOS recovery module 102 associated with the BIOS recovery mechanism 122 (block 206). As described above, the recovery instructions 136 may include, for example, a BIOS image file to be used by the recovery mechanism 122 in restoring the BIOS. The example BIOS recovery mechanism 122 is then initiated to restore the BIOS 114 to a predetermined configuration (e.g., as defined by a BIOS image file stored in the BIOS 114 and/or the recovery instructions 136 stored on the example BIOS recovery module 102).

Referring back to blocks 202, if the module 102 is not coupled to the DDC port 108, the example of FIG. 2 ends as the computing platform 100 is not instructed by a coupling of the module 102 that a BIOS recovery procedure is required. Further, referring back to block 204, if the module 102 does not include a signature corresponding to the BIOS 114 of the computing platform 100, the example of FIG. 2 ends as the computing platform 100 is not informed by the module 102 that a BIOS recovery procedure is required.

FIG. 3 is a block diagram of an example processor system that may be used to execute the machine readable instructions of FIG. 2 and/or to implement one or more the example components of the example computing platform 100 and/or the example BIOS recovery module 102 of FIG. 1. As shown in FIG. 3, the processor system 310 includes a processor 312 that is coupled to an interconnection bus 314. The processor 312 may be any suitable processor, processing unit or microprocessor. Although not shown in FIG. 3, the system 310 may be a multi-processor system and, thus, may include one or more additional processors that are different, identical or similar to the processor 312 and that are communicatively coupled to the interconnection bus 314.

The processor 312 of FIG. 3 is coupled to a chipset 318, which includes a memory controller 320 and an input/output (I/O) controller 322. The chipset 318 provides I/O and memory management functions as well as a plurality of general purpose and/or special purpose registers, timers, etc. that are accessible or used by one or more processors coupled to the chipset 318. The memory controller 320 performs functions that enable the processor 312 (or processors if there are multiple processors) to access a system memory 324 and a mass storage memory 325.

The system memory 324 may include any desired type of volatile and/or non-volatile memory such as, for example, static random access memory (SRAM), dynamic random access memory (DRAM), flash memory, read-only memory (ROM), etc. The mass storage memory 325 may include any desired type of mass storage device including hard disk drives, optical drives, tape storage devices, etc.

The I/O controller 322 performs functions that enable the processor 312 to communicate with peripheral input/output (I/O) devices 326 and 328 and a network interface 330 via an I/O bus 332. The I/O devices 326 and 328 may be any desired type of I/O device such as, for example, a keyboard, a video display or monitor, a mouse, etc. The network interface 330 may be, for example, an Ethernet device, an asynchronous transfer mode (ATM) device, an 802.11 device, a DSL modem, a cable modem, a cellular modem, etc. that enables the processor system 310 to communicate with another processor system.

While the memory controller 320 and the I/O controller 322 are depicted in FIG. 3 as separate blocks within the chipset 318, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A basic input/output system (BIOS) recovery module, comprising:
   a memory to store one or more signatures to be detected by a detector of a BIOS implemented on a computing platform; and
   a connector to removably couple the BIOS recovery module to a display data channel of the computing platform, wherein a BIOS recovery mechanism of the BIOS is to initiate in response to the detector detecting a first one of the one or more signatures of the BIOS recovery module by communicating with the memory over the display data channel.

2. A BIOS recovery module as defined in claim 1, wherein each of the one or more signatures identifies a BIOS vendor associated with a type of BIOS.

3. A BIOS recovery module as defined in claim 2, wherein the first one of the one or more signatures corresponds to a vendor associated with the BIOS of the computing platform.

4. A BIOS recovery module as defined in claim 1, further comprising a switch to enable an initiation of the BIOS recovery mechanism when the memory is coupled to the computing platform.

5. A BIOS recovery module as defined in claim 1, the connector comprising a data port to receive a first end of a cable assembly capable of coupling the BIOS recovery module to the display data channel of the computing platform via a second end of the cable assembly.

6. A BIOS recovery module as defined in claim 1, the connector comprising at least one of a cable extending from the BIOS recovery module having an end capable of coupling to the display data channel of the computing platform or a connector extending from a housing of the BIOS recovery module.

7. A BIOS recovery module as defined in claim 1, wherein the memory is to store recovery instructions to be conveyed to the BIOS recovery mechanism of the BIOS on the display data channel of the computing platform.

8. A BIOS recovery module as defined in claim 7, wherein the recovery instructions include a BIOS image file to be used by the BIOS recovery mechanism in restoring or updating the BIOS.

9. A BIOS recovery module as defined in claim 1, further comprising a power module configured to receive power from a Universal Serial Bus port of the computing platform.

10. A basic input/output system (BIOS) implemented on a computing platform, comprising: a detector to detect a signature stored on a memory of a BIOS recovery module removably coupled to a display data channel of the computing platform by communicating with the memory over the display data channel; and a BIOS recovery mechanism to be initiated in response to the detector detecting the signature on the memory of the BIOS recovery module removably coupled to the data display channel.

11. A BIOS as defined in claim 10, wherein the detector is stored in association with a boot block of the BIOS.

12. A BIOS as defined in claim 10, wherein the detector is customized for a particular video controller implemented in the computing platform.

13. A BIOS as defined in claim 10, wherein the BIOS recovery mechanism is to restore the BIOS to a predetermined configuration defined by a BIOS image file.

14. A BIOS as defined in claim 13, wherein the recovery mechanism is to receive the BIOS image file from the memory through the display data channel.

15. A BIOS as defined in claim 10, further comprising a video controller in communication with a boot block of the BIOS to receive information from the display data channel and to convey the information to the detector.

16. A method for use in association with a computing platform having a basic input/output system (BIOS), comprising:
identifying a BIOS recovery module as removably coupled to a display data channel of the computing platform using a detector of the BIOS configured to identify one or more signatures by communicating with memory of the BIOS recovery module over the display data channel; and
when a first one of the one or more signatures is detected on the BIOS recovery module removably coupled to the display data channel of the computing platform, initiating a BIOS recovery mechanism.

17. A method as defined in claim 16, further comprising retrieving recovery instructions from the BIOS recovery module for use in restoring the BIOS to a configuration.

18. A method as defined in claim 17, the recovery instructions including a BIOS image file corresponding to the configuration.

19. A method as defined in claim 16, wherein the detector is customized for a particular video controller implemented in the computing platform.

20. A method as defined in claim 16, wherein the detector is stored in association with a boot block of the BIOS.

21. A tangible machine accessible medium having instructions stored thereon that, when executed, cause a machine to at least:
identify a basic input/output system (BIOS) recovery module as removably coupled to a display data channel of a computing platform using a detector of a BIOS configured to identify one or more signatures by communicating with the BIOS recovery module over the display data channel; and
when a first one of the one or more signatures is detected on the BIOS recovery module removably coupled to the display data channel of the computing platform, initiate a BIOS recovery mechanism.

22. A tangible machine accessible medium as defined in claim 21 having instructions stored thereon that, when executed, cause a machine to retrieve recovery instructions from the BIOS recovery module for use in restoring the BIOS to a configuration.

23. A tangible machine accessible medium as defined in claim 22, the recovery instructions including a BIOS image file corresponding to the configuration.

24. A tangible machine accessible medium as defined in claim 21, wherein the detector is customized for a particular video controller implemented in the computing platform.

25. A tangible machine accessible medium as defined in claim 21, wherein the detector is stored in association with a boot block of the BIOS.

* * * * *